United States Patent
Lee et al.

(10) Patent No.: US 7,743,670 B2
(45) Date of Patent: Jun. 29, 2010

(54) METHOD AND APPARATUS FOR GAS FLOW MEASUREMENT

(75) Inventors: Jared Ahmed Lee, Santa Clara, CA (US); Ezra Robert Gold, Sunnyvale, CA (US); Chunlei Zhang, Santa Clara, CA (US); James Patrick Cruse, Capitola, CA (US); Richard Charles Fovell, San Jose, CA (US)

(73) Assignee: Applied Materials, Inc., Santa Clara, CA (US)

( * ) Notice: Subject to any disclaimer, the term of this patent is extended or adjusted under 35 U.S.C. 154(b) by 315 days.

(21) Appl. No.: 11/833,623

(22) Filed: Aug. 3, 2007

(65) Prior Publication Data

US 2008/0035202 A1 Feb. 14, 2008

Related U.S. Application Data

(60) Provisional application No. 60/822,345, filed on Aug. 14, 2006.

(51) Int. Cl.
*G01F 1/56* (2006.01)
*C25D 7/12* (2006.01)

(52) U.S. Cl. .................................... 73/861.08; 205/157
(58) Field of Classification Search ........................ None
See application file for complete search history.

(56) References Cited

U.S. PATENT DOCUMENTS

| | | | | |
|---|---|---|---|---|
| 6,119,710 | A * | 9/2000 | Brown ........................ | 137/14 |
| 6,216,726 | B1 * | 4/2001 | Brown et al. ................. | 137/486 |
| 6,299,753 | B1 * | 10/2001 | Chao et al. .................. | 205/157 |
| 6,508,913 | B2 * | 1/2003 | McMillin et al. ......... | 156/345.29 |
| 6,704,667 | B2 * | 3/2004 | Wei et al. ...................... | 702/45 |
| 2003/0145791 | A1 * | 8/2003 | Shinya et al. ............... | 118/724 |
| 2003/0190804 | A1 * | 10/2003 | Glenn et al. ................. | 438/689 |
| 2003/0212507 | A1 * | 11/2003 | Wei et al. ...................... | 702/45 |
| 2004/0261492 | A1 | 12/2004 | Zarkar et al. | |
| 2006/0123920 | A1 | 6/2006 | Tison et al. | |
| 2006/0162466 | A1 * | 7/2006 | Wargo et al. ............. | 73/861.63 |
| 2006/0280867 | A1 * | 12/2006 | Park et al. ................. | 427/248.1 |
| 2008/0000530 | A1 * | 1/2008 | Sun et al. ................... | 137/487.5 |

FOREIGN PATENT DOCUMENTS

| | | |
|---|---|---|
| EP | 0 323 205 | 7/1989 |
| JP | 2004-003957 | 1/2004 |
| JP | 2006-012872 | 1/2006 |
| KR | 2006-0004656 | 1/2006 |
| WO | 97 19329 | 5/1997 |
| WO | 97/19329 A1 | 5/1997 |

OTHER PUBLICATIONS

Extended European Search Report dated Dec. 18, 2007 for Application No. 07015987.6. (APPM/010320EP).
GBROR® data sheet; Gas Box Rate-of-Rise in Situ Flow Verifier, MKS Instruments, Inc., http://www.mksinst.com/docs/UR/gbror.pdf; downloaded Nov. 16, 2007. copy consists of 8 pages, Mar. 2007.
Tru-Flow® data sheet, Mass Flow Verifier, MKS Instruments, Inc., htttp://www.mksinst.com/docs/UR/massflotruflo.pdf, downloaded Nov. 16, 2007, copy consists of 4 pages. Sep. 2005.
Notification of the First Office Action from Chinese Patent Office of 200710140455.3 dated Mar. 13, 2009.
Official Letter dated Apr. 29, 2009 from Korean Patent Office for corresponding Korean Patent application No. 10-2007-0081657. A concise statement of relevance is provided.
Office Action dated Dec. 15, 2009 for Korean Patent Application No. 10-2007-0081657. (APPM/011320 KORS).

\* cited by examiner

*Primary Examiner*—Harshad Patel
(74) *Attorney, Agent, or Firm*—Patterson & Sheridan, LLP (57) ABSTRACT

A method and apparatus for measuring gas flow are provided. In one embodiment, a calibration circuit for gas control may be utilized to verify and/or calibrate gas flows utilized for backside cooling, process gas delivery, purge gas delivery, cleaning agent delivery, carrier gases delivery and remediation gas delivery, among others.

20 Claims, 7 Drawing Sheets

METHOD AND APPARATUS FOR GAS FLOW MEASUREMENT

CROSS-REFERENCE TO OTHER APPLICATIONS

This application claims the benefit of U.S. Provisional Application No. 60/822,345 filed Aug. 14, 2006, which is herein incorporated by reference.

BACKGROUND OF THE INVENTION

1. Field of the Invention

Embodiments of the present invention generally relate to a method and apparatus for measuring gas flow. More specifically, embodiments of the invention generally relate to a method and apparatus for measuring gas flows that are provided to a semiconductor processing chamber and related utilities.

2. Description of the Related Art

Accurate control of gas flows is an important process control attribute critical to many microelectronic device fabrication processes. Providing gas between a substrate and a substrate support in a semiconductor processing chamber is a well-known method for improving heat transfer between the substrate and the substrate support, thereby enhancing the precision of substrate temperature control and uniformity. Additionally, precise control of process gas flows into the processing chamber are required in order to obtain desired processing results, particularly as critical dimensions and film thicknesses shrink. Furthermore, gases may be added to processing chamber effluent streams to mitigate the environmental impact of substrate processing. Good control of the gases added to the effluent stream is necessary to ensure both cost effective and proper remediation.

Conventional gas delivery systems used with semiconductor processing chambers generally include a mass gas flow meter (MFC) as the primary flow regulation device. However, the accuracy of MFC's may be affected by a plurality of factors that contribute to an uncertainty of the actual gas flow. For example, the accuracy of the MFC will typically vary with changes in temperature, line pressure and volume. Deviation from the gas flow set point due to MFC inaccuracy may contribute to processing defects, poor emission control and inefficient waste of costly gases.

Although conventional pressure control systems have proven relatively reliable, field experience with the existing technology has increased the demand for more accurate measurement of flow. For example, poor control of gas flows used in backside substrate cooling applications may result in poor substrate temperate control, thereby causing poor film deposition or etching results, which cannot be tolerated in next generation circuit designs.

Therefore, there is a need for an improved method and apparatus for measuring gas flows so that the delivery of gases in a semiconductor processing system may be performed with greater confidence and accuracy.

SUMMARY OF THE INVENTION

A method and apparatus for measuring gas flow are provided. In one embodiment, a calibration circuit for measuring gas flow may be utilized to verify and/or calibrate gas flows utilized for backside cooling, process gas delivery, purge gas delivery, cleaning agent delivery, carrier gases delivery and remediation gas delivery, among others.

In one embodiment, an apparatus for measuring gas flow in a processing system includes a gas source, a diverter valve, an orifice, a regulating device and a sensing circuit. The regulating device is fluidly coupled between the gas source and an inlet of the diverter valve. The orifice is fluidly coupled to a first outlet of the diverter valve and has substantially the same flow resistance as a processing chamber. The sensing circuit is configured to receive the flow of gases passing through the orifice.

In one embodiment, the sensing circuit utilizes a calibrated volume for receiving the gas flow. From properties and/or attributes measured from the gas in the calibrated volume, the flow rate and/or pressure of the gas entering the sensing circuit may be verified.

In another embodiment, the sensing circuit utilizes a non-calibrated volume for receiving the gas flow. From changes in the properties and/or attributes measured over time of the gas in the non-calibrated volume, the flow rate and/or pressure of the gas entering the sensing circuit may be verified.

In another embodiment, the regulating device may be at least one of a vapor delivery module, a flow divider, a pressure controller, a regulator or a mass flow controller. In another embodiment, the sensing circuit may include a tank having a calibrated volume. In another embodiment, the sensing circuit may include vibrating member disposed in the calibrated volume. In another embodiment, the sensing circuit may include a sensor configured to detect at least one of electrical or magnetic characteristics of gases disposed in the calibrated volume. In yet another embodiment, the sensing circuit may include a tank supported by a cantilever.

A method for measuring gas flow in a semiconductor processing system is also provided. In one embodiment, a method for measuring gas flow in a semiconductor processing system includes setting a gas flow with a flow control device, flowing the gas from the flow control device through an orifice having substantially the same flow resistance as a processing chamber into a sensing circuit, and comparing a flow determined using the sensing circuit with the setting of the flow control device.

In another embodiment, the method may include sampling a characteristic of a gas present in the sensing circuit until an endpoint is reached. In another embodiment, the method may include sampling until a confidence limit is reached. In another embodiment, the method may include sampling until data converges within a predetermined range. In yet another embodiment, the method may include sampling at a frequency rate of less than about 5 millisecond.

BRIEF DESCRIPTION OF THE DRAWINGS

So that the manner in which the above recited features of the present invention may be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures. It is contemplated that features of one embodiment may be beneficially incorporated in other embodiments without further recitation.

DETAILED DESCRIPTION

Figure 1:
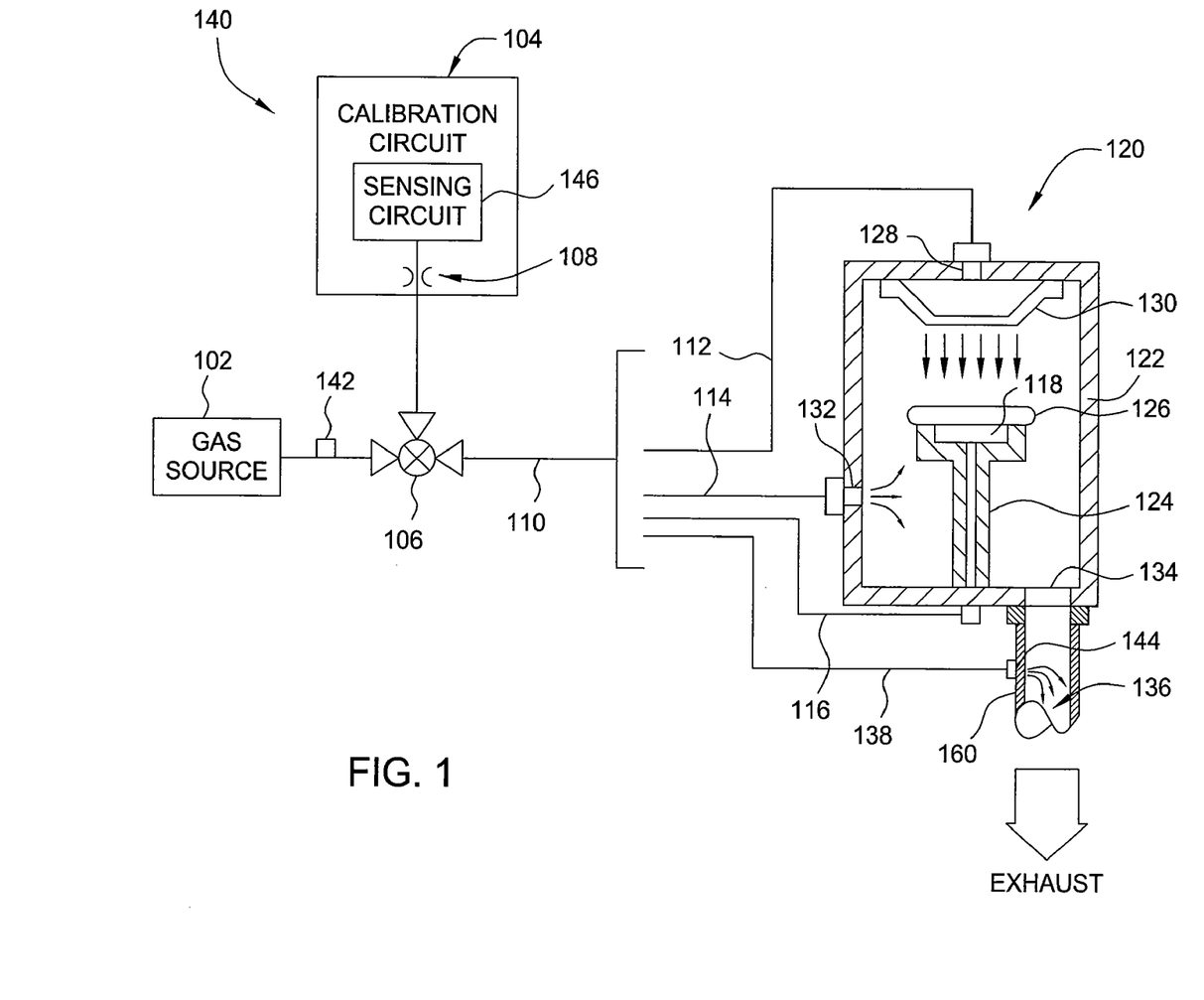
FIG. 1 is a simplified schematic of a conventional semiconductor processing chamber and gas delivery system having a calibration circuit of the present invention.

FIG. 1 depicts a simplified schematic of a substrate processing system having one embodiment of a gas delivery system 140 of the present invention coupled to an exemplary a semiconductor processing chamber 120. The processing chamber 120 may be configured to perform chemical vapor deposition (CVD), physical vapor deposition (PVD), etch chamber, ion implant, thermal processing, ashing, degassing, orientation or other vacuum processing techniques.

The processing chamber 120 includes a substrate support 124 disposed in a chamber body 122. The substrate support 124 generally supports a substrate 126 during processing. The substrate support 124 generally includes a passage formed therethrough for delivering a heat transfer gas (hereinafter referred to as backside gas) to an area 118 defined between the substrate 126 and substrate support 124. The size of the area 118 has been exaggerated in FIG. 1 for clarity. Examples of common backside gases include helium, nitrogen and argon.

The chamber body 122 generally includes at least one process gas inlet 128 and a pumping port 134. The process gas inlet 128 generally provides process and optionally other gases to the interior volume of the processing chamber 120 to facilitate substrate processing, as is conventionally known. The gases entering the chamber body 122 may be distributed across the substrate 126 by a gas distribution plate, or showerhead 130.

The pumping port 134 is formed in the chamber body 122. The pumping port 134 is generally coupled to a pumping system that controls the chamber pressure and removes processing by-products from the interior volume of the chamber body 122. The pumping system typically includes one or more vacuum pumps and throttle valves, which are not shown.

A treatment gas port 144 may be provided to deliver remediation gases into a conduit 160 carrying the effluent stream exiting the chamber body 122 via the pumping port 134. For example, gases may be provided to react and/or absorb hazardous reaction by-products, excess process gases or gaseous chamber waste to facilitate removal and/or recovery of certain materials from the effluent stream.

A purge port 132 may also be provided in the chamber body 122. Inert gases may be provided through the purge port 132 into the processing chamber 120 to prevent process gases and/or process by-products from entering certain regions of the chamber 120. Examples of purge gases include nitrogen and helium.

Gases are generally provided to the inlet port 128, the area 118, the purge port 132 and the treatment gas port 144 from one or more gas delivery circuits. Each gas delivery circuit generally includes a mechanism for the precise control of the gases flowing therethrough, and at least one of which, may be configured as the gas delivery system 140 of the present invention. For the sake of brevity, one gas delivery system 140 is shown coupled to gas delivery lines 112, 114, 116, 138 respectively routed to the inlet port 128, the area 118, the purge port 132 and the treatment gas port 144. In practice, each line 112, 114, 116, 138 may be respectively coupled to dedicated, separate circuit gas delivery systems 140.

In one embodiment, the gas delivery system 140 includes a gas source 102, a mass flow meter (MFC) 142, a diverter valve 106 and a calibration circuit 104. The diverter valve 106 selectively directs flow from the gas source 102 to the calibration circuit 104 or one of the lines 112, 114, 116, 138 through a conduit 110. The MFC 142 is disposed between the gas source 102 and the diverter valve 106. The MFC 142 is generally utilized to monitor and control the flow from the gas source 102 into either the calibration circuit 104 or conduit 110 coupling the gas delivery system 140 to the processing chamber 120.

The calibration circuit 104 is configured to accurately measure gas flow. The calibration circuit 104 includes an orifice 108 and a sensing circuit 146. The orifice 108 is disposed between the sensing circuit 146 and the diverter valve 106. The orifice 108 may be sized such that the restriction maintains a chocked flow condition. In one embodiment, the size of the orifice is selected to simulate the restriction of the actual processing chamber 120. This creates conditions similar to the MFC 142 flowing into the processing chamber 120 under which to perform flow verifications using the calibration circuit 104, while not requiring flow into the actual processing chamber 120. The orifice may be determined by experimentation, empirical analysis or by other suitable method. In one embodiment, the orifice 108 may be determined by measuring the pressure downstream of the orifice and adjusting the orifice size until a desired pressure is realized. In another embodiment, the size of the orifice may be selected to be different than the restriction of the actual processing chamber 120, as long as the flow is maintained in a chocked flow condition.

The orifice 108 is sized to create a critical flow (e.g., chocked flow) condition into the sensing circuit 146. Critical flow into the sensing circuit 146 means that the flow is determined by the mass flow rate and aperture size of the orifice 108. The flow upstream of the orifice 108 (e.g., at the MFC 142) is constant and unaffected by pressure fluctuations, thus the upstream volume need not be considered during flow calculations.

The orifice 108 may be a fixed or variable restriction. In one embodiment, the orifice 108 may be a machined aperture. In another embodiment, the orifice 108 may be adjustable, such as a needle valve.

Figure 2:
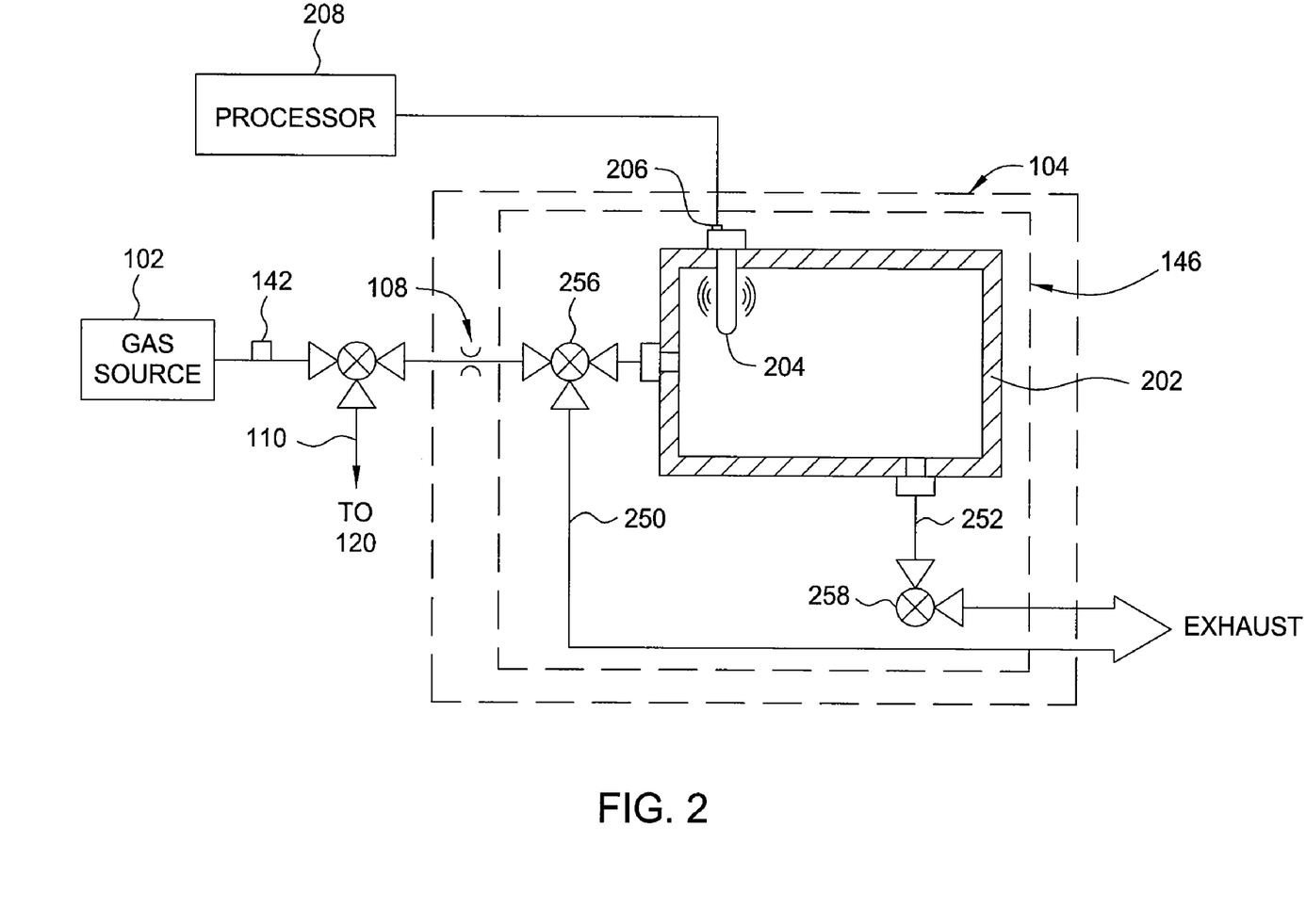
FIGS. 2-9 are simplified schematics of a calibration circuit having various embodiments of a sensing circuit.

FIG. 2 is a schematic diagram of one embodiment of the sensing circuit 146. The sensing circuit 146 generally includes a tank 202 having a vibrating member 204 disposed therein. A sensor 206 is interfaced with the vibrating member 204 in a manner suitable for providing a processor 208 with a metric indicative of the frequency of oscillation of the vibrating member 204, which may be correlated to the density of gas within the tank 202. In one embodiment, the sensor 206 is an accelerometer or other suitable senor.

In one embodiment, the tank 202 has a known or predetermined volume. Gas flowing into sensing circuit 146 through the orifice 108 from the gas source 102 will increase the pressure inside the tank 202, and thus the density of the gas the tank 202. Since the volume of the tank 202 is known, the frequency of the vibrating member 204 may be correlated to the mass of the gas within the tank 202. The change in the frequency of oscillation of the vibrating member 204, given the known tank volume, provides information related to the density change within the tank 202, which is also related to the mass flow rate through the MFC 142. Thus, the frequency of the vibrating member may be utilized to verify and/or calibrate the flow through the MFC 142.

In another embodiment, the volume of the tank 204 may not be known. In this embodiment, the change in frequency of the oscillating member 204 may be used to verify and/or calibrate the flow rate through the MFC 142.

Figure 3:
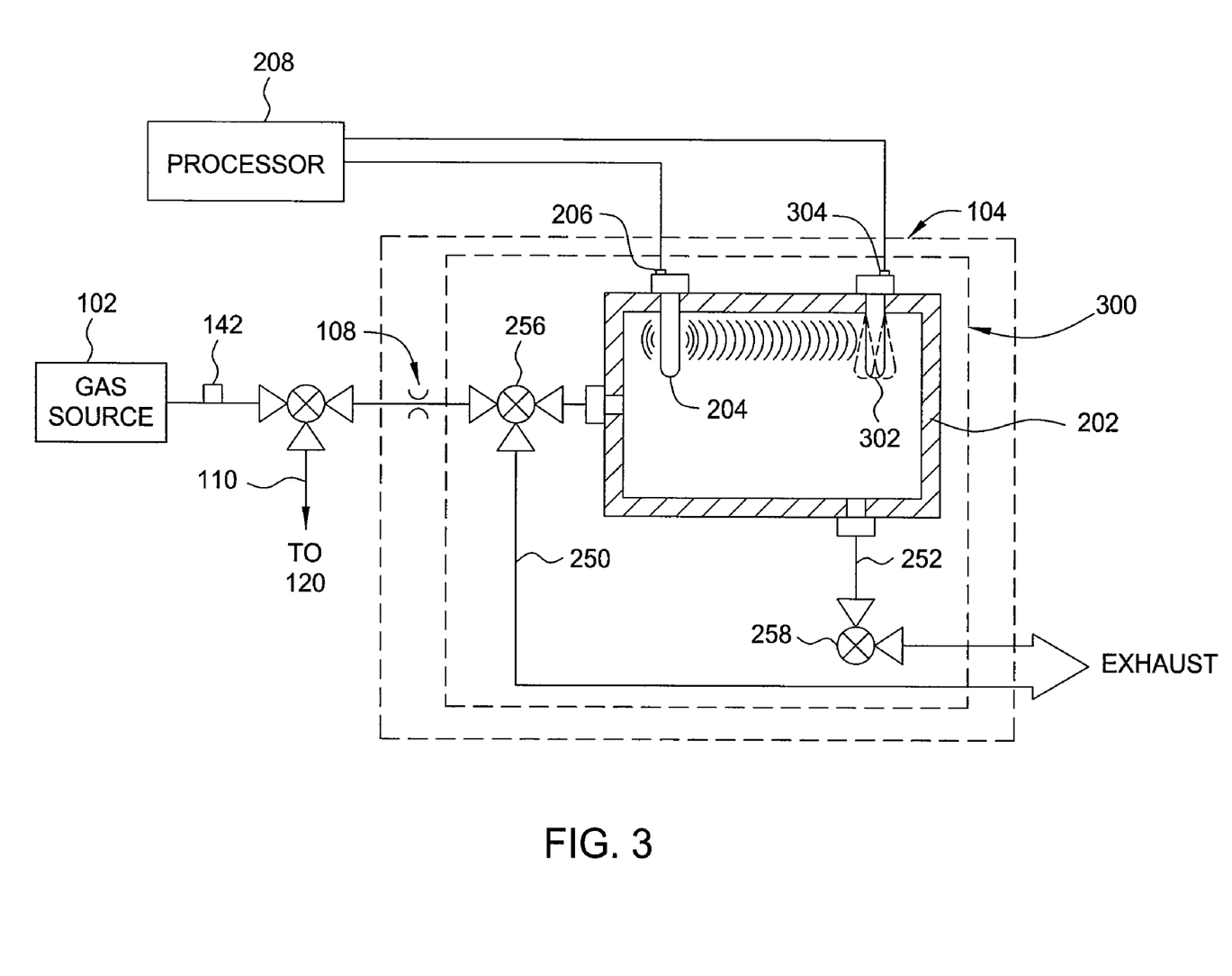

FIG. 3 is a schematic diagram of another embodiment of a sensing circuit 300. The sensing circuit 300 generally includes a tank 202 having a vibrating member 204 and a secondary member 302 disposed therein. The secondary member 302 is positioned opposite the vibrating member 204. A first sensor 206 is interfaced with the vibrating member 204 in a manner suitable for providing a processor 208 with a metric indicative of the frequency of oscillation of the vibrating member 204. A second sensor 304 is interfaced with the secondary member 302 in a manner suitable for providing the processor 208 with a metric indicative of the frequency of oscillation of the secondary member 302.

The vibrating member 204 may be driven at a constant frequency. Energy from the vibrating member 204 is transferred through the gas disposed in the tank 202 and causes the second member 302 to oscillate at a constant frequency. The oscillation of the second member 302 will have a phase shift and amplitude of vibration different than that of the vibrating member 204. These quantities may be measured by the sensors 206, 304 and related to a change in pressure in the tank, which over time relates to a mass flow rate which may be utilized to verify and/or calibrate the flow rate through the MFC 142.

Figure 4:
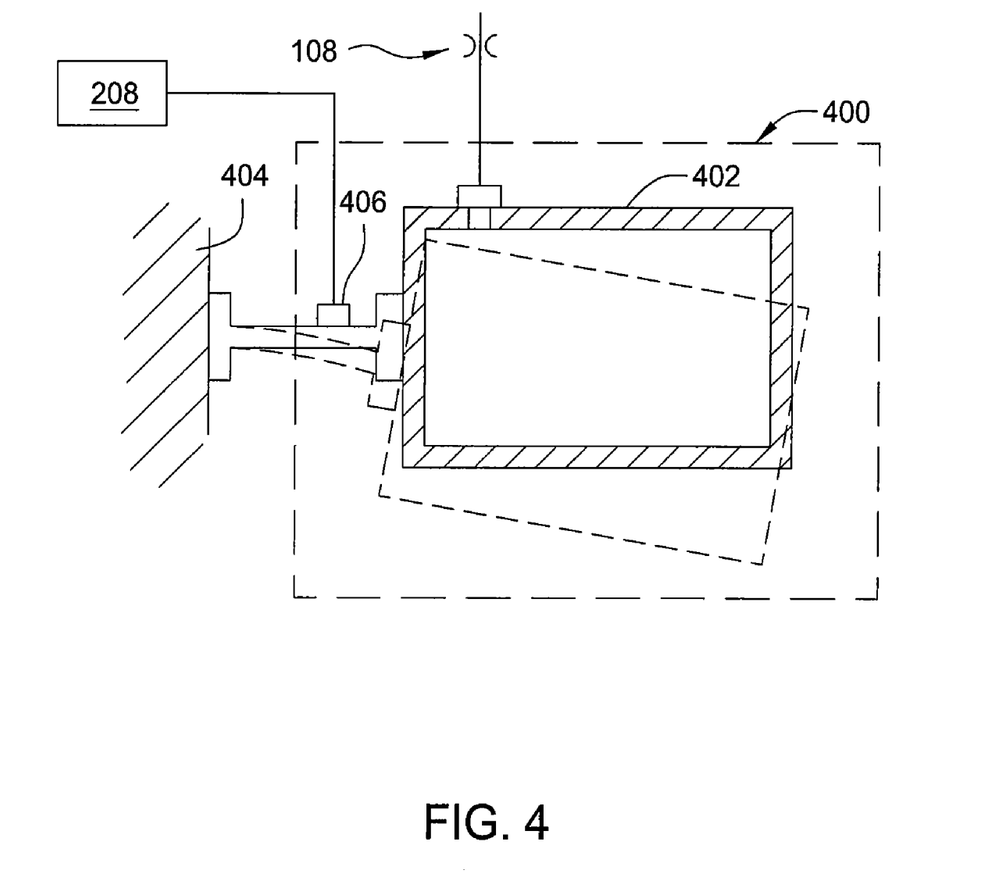

FIG. 4 is a schematic diagram of another embodiment of a sensing circuit 400. The sensing circuit 400 generally includes a tank 402 mounted in a cantilevered orientation from a surface 404. The mass of gas in the tank 402 is related to the deflection of the cantilevered tank, which may be measured by a sensor 406. The sensor 406 may be a strain gauge or a distance measuring device, such as an LVDT. As gas flows into the tank 402, the pressure and density of the gas in the tank 402 will increase, thereby causing a change in the orientation of the tank 402 which is correlated to the additional mass of gas that has been added to the tank 402. The change in tank orientation due to the change in the mass of gas in the tank may be measured by the sensor 406. Thus, the information from the sensor 406 may be utilized to verify and/or calibrate the MFC 142.

Figure 5:
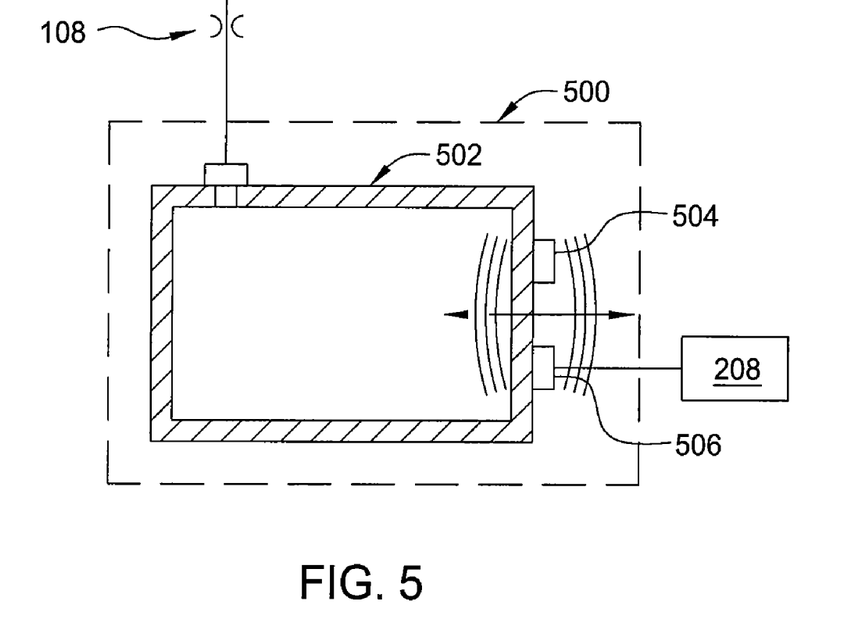

FIG. 5 is a schematic diagram of another embodiment of a sensing circuit 500. The sensing circuit 500 generally includes a tank 502, a displacement device 504 and a sensor 506. The tank 502 has a calibrated volume. The displacement device 504 may be actuated to disturb the tank 502 such as to cause the tank 502 to oscillate. The displacement device 504 may be a transducer, actuator, or other suitable vibration generating device. The sensor 506, which may be an accelerometer or other suitable detector, is interfaced with the tank 502 to provide a processor 208 with a metric indicative of the frequency of the tank oscillation. As the mass of gas in the tank 502 increases, the frequency of oscillation will change in a predictable manner which is indicative of a mass flow rate into the tank 502. Thus, the information obtained by the sensor 506 may be utilized to verify the flow rate through the MFC 142.

In another embodiment, the wall of the tank 502 may be perturbed by the displacement device 504 such that it vibrates. As the pressure inside the tank 502 changes, the stress on the wall will change and the frequency of the vibration will change predictably. The vibration may be measured by the sensor 506, and because the volume is known, the pressure change over time may be related to the mass flow rate entering the sensing circuit 500 and may be utilized to verify and/or calibrate the flow rate through the MFC 142.

Figure 6:
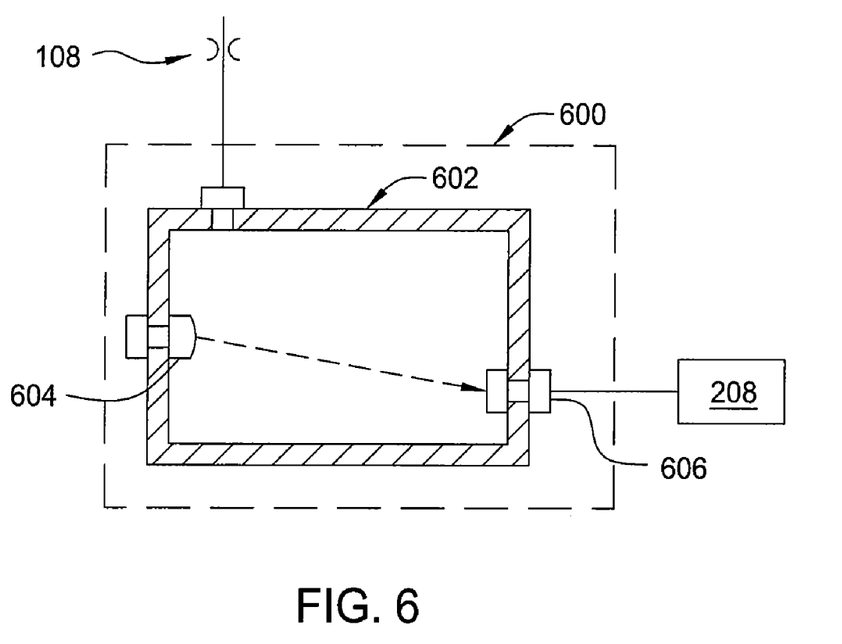

FIG. 6 is a schematic diagram of another embodiment of a sensing circuit 600. The sensing circuit 600 generally includes a tank 602, a signal generator 604 and a sensor 606. The tank 602 has a calibrated volume. The signal generator 604 and the sensor 606 may be mounted inside or outside the tank 602.

In one embodiment, the signal generator 604 is configured to generate an acoustic pulse inside the calibrated volume of the tank 602. The local speed of the acoustic pulse is related to the density and temperature of the medium (e.g., the gas within the tank). The speed of the acoustic pulse may be measured by the sensor 606, and related to the density of the gas within the tank 602. As the volume of the tank 602 is known, the mass of the gas within the tank 602 may be determined using the sensor information and utilized to verify and/or calibrate the flow rate through the MFC 142.

In another embodiment, the signal generator 604 may provide an RF signal or other electromagnetic pulse in the tank 602 to measure the density of gas within the tank. Characteristics of these signals vary predictably with pressure and the sensor 606 may be utilized to provide a metric indicative of at least one of the signal characteristics. The change of the measured characteristics over time may be correlated to a mass flow rate into the sensing circuit 600, and utilized to verify and/or calibrate the flow rate through the MFC 142.

In another embodiment, the sensor 606 may be configured to detect changes in at least one of electrical or magnetic characteristics of the gas within the tank 602. The electrical or magnetic characteristics change predictably with pressure and may be measured by the sensor 606. The metric of change in the electrical or magnetic characteristics of the gas provided by the sensor 606 may be used to determine flow rate through the circuit 600. The pressure change over time relates to a mass flow rate in the known volume of the tank 602, and as such, may be utilized to verify and/or calibrate the flow rate through the MFC 142.

Figure 7:
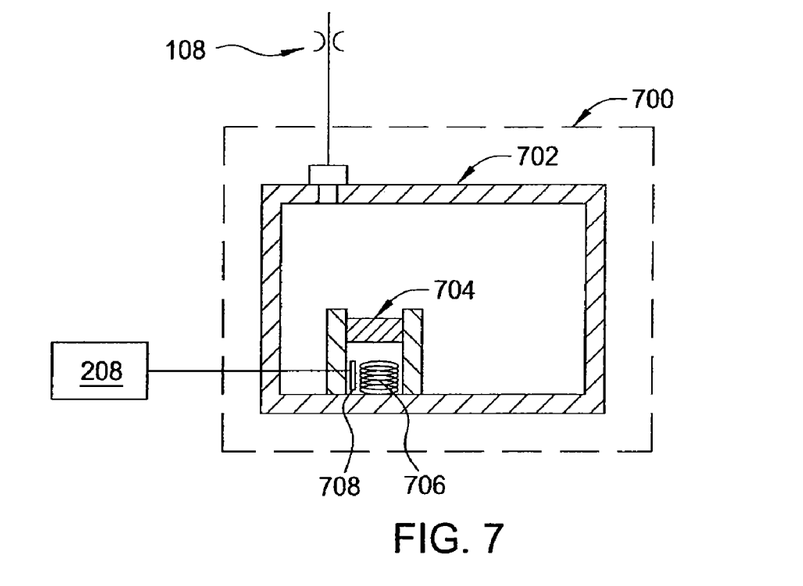

FIG. 7 is a schematic diagram of another embodiment of a sensing circuit 700. The sensing circuit 700 generally includes a tank 702 having a piston 704 disposed therein. The piston 704 has a known weight and surface area. The piston 704 will be displaced against an opposing member 706 relative to the pressure within the tank 702. The opposing member 706 may be a spring and/or sealed volume of gas. The force needed to move the piston 704 may be resolved from the mass and surface area of the piston 704, the spring force of the opposing member 706, along with the pressure above the piston 704, which can either be controlled or known as a function of piston displacement. In one embodiment, a sensor 708 is interface with the piston 704 to directly determine the force acting upon the piston. In another embodiment, the sensor 708 may be configured to determine the displacement of the piston 704. The force is related to the pressure by the surface area of the piston 704, and the pressure change over time in the known volume may be related to the mass flow rate into the tank 704 and utilized to verify and/or calibrate the flow rate through the MFC 142.

Figure 8:
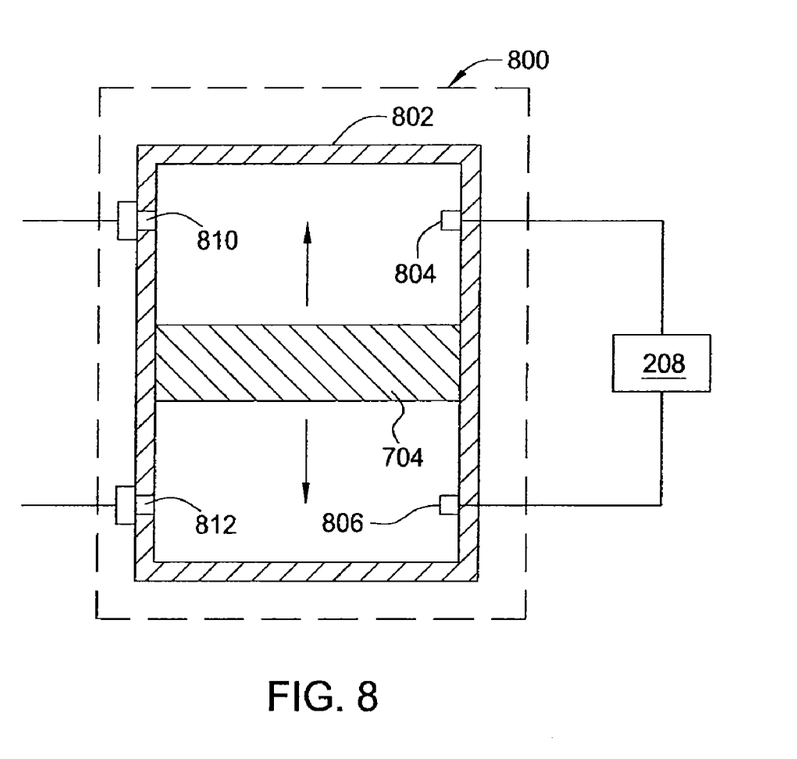

FIG. 8 is a schematic diagram of another embodiment of a sensing circuit 800. The sensing circuit 800 generally includes a tank 802 having a piston 704 disposed therein. Flow from the orifice 108 is provided into the tank 802 through first and second inlets 810, 812 respectively positioned above and below the piston 704. The piston 704 has known characteristics and will be displaced proportionately to a ratio of flows through the inlets 810, 812. At least one sensor is utilized to determine the relative displacement of the piston 704. In the embodiment depicted in FIG. 8, sensors 804, 806 are utilized to determine the displacement of the piston 704 which may be correlated to the flow through the MFC 142.

Figure 9:
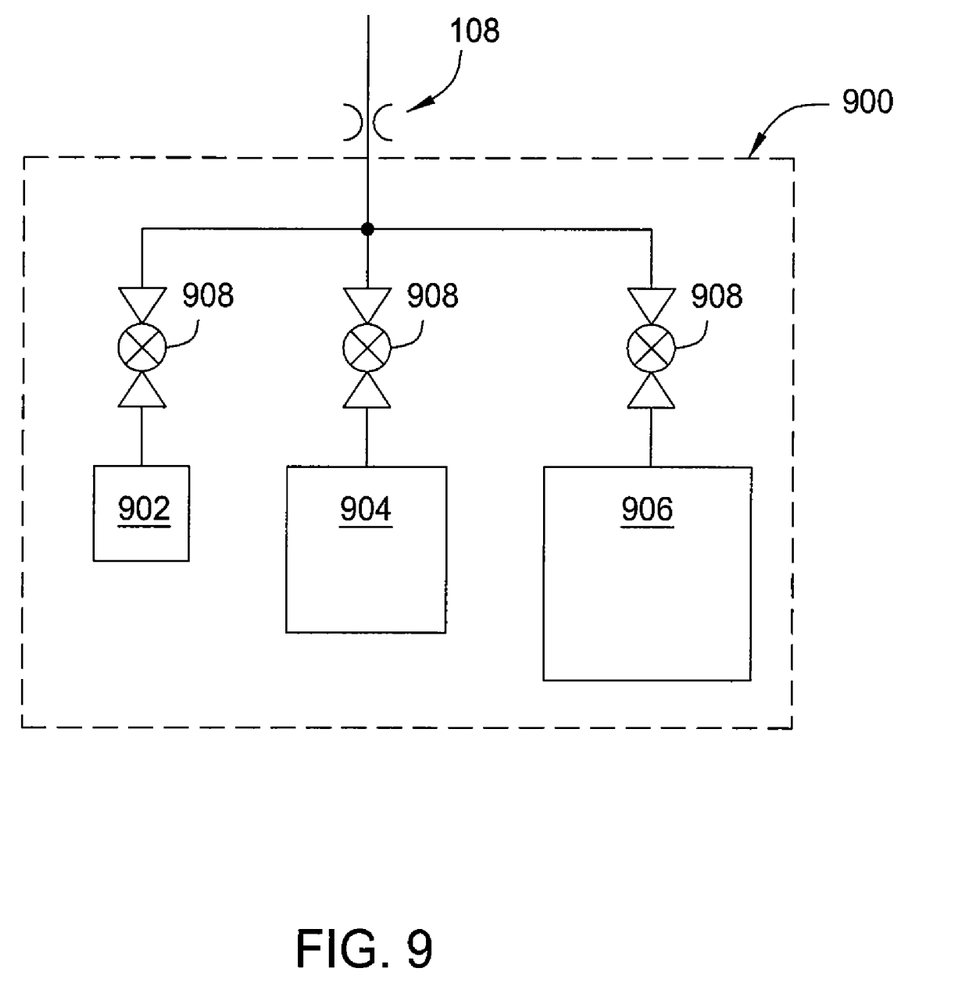

FIG. 9 is a schematic diagram of another embodiment of a sensing circuit 900. The sensing circuit 900 generally includes a plurality of tanks (shown as tanks 902, 904, 906) coupled to the orifice 108 through a selector valve 908. Each tank 902, 904, 906 has a different calibrated volume for use with different ranges of flow rates. For example, tank 902 may have a small volume, tank 904 may have an intermediate volume, while tank 906 may have a large volume. The valve 908 is utilized to direct the flow in the circuit 900 to a tank having a volume commensurate flow rate so that good data resolution may be obtained over a reasonable sampling period. For example, the smaller tank 902 may be utilized to achieve to achieve greater time resolution for a given pressure rise over a given period of time when low flow rates are being measured. Thus, at low flow rates, the smaller tank 902 facilitate obtaining a rapid pressure rise over time, which provides data set having good resolution over a short sample period. Conversely, the larger tank 908 may be utilized to obtain a pressure rise over time that is not too rapid, thereby providing data having good resolution at high flow rates. Moreover, the larger tank 908 allows the data sample to occur over a longer period of time since the tank holds more volume relative to the small tank 902, which may be filled at high flow rates before a complete data set is obtained. Data relating to the pressure rise may be obtained using any of the techniques described above, or other suitable alternative.

Multiple data samples of the pressure rise may be utilized to improve the accuracy of the flow calculation, thereby providing greater confidence of the actual flow rate of the MFC 142. Each of the sensing circuits described above may include a bypass loop and dump line which allows the tank to be rapidly emptied and refilled, thereby facilitating the rapid acquisition of additional samples. Data samples are obtained at a sufficient rate to obtain a statistically valid sample population of data points in a reasonable period of time. In one embodiment, the frequency rate of sampling is less than about 5 milliseconds. This allows a large data set to be obtained over a shorter test duration, thereby increasing the accuracy of the data while allowing an appropriate endpoint of the test to be rapidly identified.

In one embodiment, the combined measurement error of the sensors/equipment utilized to obtain the data samples may be analyzed to determine their effect on the overall calculation. This information may be utilized to determine and/or adjust the confidence limits.

In another embodiment, the combined measurement error of the sensors/equipment utilized to obtain the data samples may be utilized to simulate a random error distribution in the measured data. A simulated error is then added to each data sample. The number of samples needed to cancel out the effects of the randomly added error may be calculated and utilized as a test end point so that the accurate calculations are realized within the shortest test duration An exemplary bypass loop 250 and dump line 252 are shown in the embodiment depicted in FIG. 2. The flow from the orifice 108 initially goes into the tank 202 and the pressure (density and/or mass) is measured. The flow through the sensing circuit 200 is then diverted by a valve 256 through the bypass loop 250 while a second valve 258 is opened to empty the tank 202 through the dump line 252. The dump line 252 may be coupled to an exhaust to expedite the removal of gases from the tank 202. Once the tank 202 is sufficiently emptied, the second valve 258 is closed and the flow from the orifice 108 is then directed by the valve 256 back to the tank 202 so that a subsequent sample may be obtained. This process may be repeated multiple times to obtain a data set that provides an accurate measurement of the flow through the MFC 142.

The processor 208 receiving the data set may use statistical convergence techniques and/or classical robust statistics to determine an appropriate endpoint of the flow verification/calibration. For example, the sampling may be terminated once a suitable convergence calculated based on the known accuracy and repeatability of the measurement devices of the sensing circuit is reached. The sampling endpoint may alternatively be determined dynamically by continuously calculating flows and tracking the convergence toward a mean value.

The desired level of convergence may be a predetermined level or be determined dynamically using a confidence limit. Once the test has reached a specified confidence level, the test will terminate. One method of ending the test is to use the known error levels of the measurement devices and use them to calculate the number of samples needed for convergence. Using this predictive method the verification will automatically end once that number of samples has been taken. Another method to determine the endpoint is to continuously recalculate the flow and monitor its convergence toward a mean value. As the test runs, every combination of samples collected may be used to calculate the instantaneous flow. When the calculated flows converge to a desired level, the test will terminate. The use of multivariate models and statistics to model measurement errors and their effects on the overall system may be used to increase the accuracy of the calculations. The models will show the interaction of different parameters and aid in the selection of optimal parameters.

Multiple samples of the beginning and ending pressures and/or densities may be used to increase accuracy. Measurement error on both readings will be decreased by averaging multiple samples of each reading, thus making the actual pressure delta for the test more accurate.

Multivariate models and statistics may be used to model the error of the individual measurements and their effects on the overall system error. These models may be used to determine optimal parameters and system limits. Combinations of the previous techniques may be used to further increase the accuracy of the flow rate calculation.

In operation, flow is determined using standard rate of rise techniques within the tank. The orifice at the inlet of the tank is sized to create sonic flow entering the tank. The flow into the tank is then related only to the flow from the MFC and the size of the orifice. The tank pressure will have no effect on the MFC, and as such, will allow the flow to remain constant. In addition, the sonic condition at the orifice prevents the upstream pressure from changing, and as such, the mass of gas in the gas line upstream of the orifice remains constant. Under this condition the gas line volume upstream is not utilized in flow calculations, thereby eliminating the need for an upstream volume calculation and further reducing uncertainty in overall flow calculation.

Since the orifice at the tank inlet simulates chamber conditions by emulating a restriction similar to a chamber injection, the MFC can be calibrated under simulated chamber conditions without requiring the actual chamber to be physically present, for example, during bench or pre-installation testing. Alternatively, the flow through the MFC may be verified and/or calibrated using the calibration circuit as desired once the chamber is in operation, such as periodic test performed prior to running a new lot of substrates.

It is also contemplated that the calibration circuit may be utilized to verify and/or calibrate flow control devices other than MFC's. For example, the calibration circuit may be utilized to verify and/or calibrate flow rates (density and/or pressures) from vapor delivery modules, flow dividers, pressure controllers and regulators, among other flow control devices.

Thus, gas delivery systems having calibration circuit that advantageously enable characterization of the MFC utilized to provide gases to a processing system. The innovative calibration circuit may be utilized to measure, verify and/or calibrate gas flows utilized for backside cooling, process gas delivery, purge gas delivery, cleaning agent delivery, carrier gases delivery and remediation gas delivery, among others. The accuracy and sampling time of the gas flow control has been improved over the state of the art, thereby enabling cost effective and robust processing of next generation devices.

While the foregoing is directed to embodiments of the present invention, other and further embodiments of the invention may be devised without departing from the basic scope thereof, and the scope thereof is determined by the claims that follow.

What is claimed is:

1. Apparatus for delivering gas in a processing system having a processing chamber, comprising:
    a gas source;
    a diverter valve having an inlet, a first outlet and a second outlet, the second outlet coupled to the processing chamber;
    a regulating device fluidly coupled between the gas source and the inlet of the diverter valve;
    an orifice fluidly coupled to the first outlet of the diverter valve, the orifice having substantially the same flow resistance as the processing chamber; and
    a sensing circuit configured to receive flow passing through the orifice, wherein the sensing circuit comprises:
        a sensor;
        a by-pass loop around the sensor;
        a tank; and
        a valve diverting the flow from the orifice between the tank and the by-pass loop.

2. The apparatus of claim 1, wherein the regulating device further comprises at least one of a vapor delivery module, a flow divider, a pressure controller, a regulator or a mass flow controller.

3. The apparatus for claim 1, wherein the tank has a calibrated volume.

4. The apparatus for claim 3, wherein the sensing circuit further comprises:
    a vibrating member disposed in the calibrated volume.

5. The apparatus for claim 3, wherein the sensor is configured to detect at least one of electrical or magnetic characteristics of gases disposed in the calibrated volume.

6. The apparatus for claim 1, wherein the tank is supported by a cantilever.

7. The apparatus for claim 1, wherein the sensing circuit has a calibrated volume for receiving the gas flow, and the sensor arranged to measure at least one property and/or attribute of the gas in the calibrated volume from which a flow rate and/or pressure of the gas entering the sensing circuit may be resolved.

8. The apparatus for claim 1, wherein the sensing circuit further has a non-calibrated volume for receiving the gas flow, and the sensor arranged to measure changes in at least one property and/or attribute of the gas in the non-calibrated volume from which a flow rate and/or pressure of the gas entering the sensing circuit may be resolved.

9. A method for calibrating a flow control device in a semiconductor processing system, comprising:
    setting a gas flow with the flow control device;
    flowing the gas from the flow control device through an orifice having substantially the same flow resistance as a processing chamber into a sensing circuit;
    flowing the gas into a volume of the sensing circuit;
    sensing at least one property and/or attribute of the gas in the volume;
    resolving a flow rate and/or pressure of the gas entering the sensing circuit from the sensed property and/or attribute; and
    comparing a flow determined using the sensing circuit with the setting of the flow control device.

10. The method of claim 9, wherein the volume of the sensing circuit is a calibrated volume.

11. The method of claim 9, wherein the volume of the sensing circuit is a non-calibrated volume.

12. The method of claims 11, wherein resolving the flow rate and/or pressure of the gas entering the sensing circuit is determined without using a known volume upstream of the sensing circuit.

13. A method for calibrating a flow control device, comprising:
    setting a gas flow with the flow control device;
    flowing the gas from the flow control device through an orifice having substantially the same flow resistance as a processing chamber into a sensing circuit;
    comparing a flow determined using the sensing circuit with the setting of the flow control device; and
    sampling a characteristic of a gas present in the sensing circuit until an endpoint is reached.

14. The method of claim 13, wherein sampling further comprises:
    sampling until a confidence limit is reached.

15. The method of claim 13, wherein sampling further comprises:
    sampling until data converges within a predetermined range.

16. The method of claim 13, wherein sampling further comprises:
    sampling at a frequency rate of less than about 5 millisecond.

17. A method for providing a process gas in a semiconductor processing system, comprising:
    providing a processing system having a gas source coupled to a processing chamber and sensing circuit, the sensing circuit having substantially the same flow resistance as the processing chamber;
    setting a flow control device to provide a flow of process gas from the gas source at target rate, the target rate being a predefined rate selected for substrate processing in the processing chamber, the flow exiting the flow control device being at an actual rate;
    flowing the process gas at the actual rate into the sensing circuit while bypassing the processing chamber;
    sensing a metric indicative of the actual flow rate;
    adjusting the setting of the flow control device to correct differences between the actual rate and the target rate; and
    flowing the process gas from the flow control device into the processing chamber and processing a substrate therein.

18. The method of claim 17, wherein sensing further comprises:
    flowing the process gas into a calibrated volume; and
    measuring at least one property and/or attribute of the process gas in the calibrated volume from which a flow rate and/or pressure of the process gas entering the sensing circuit may be resolved.

19. The method of claim 17, wherein sensing further comprises:

flowing the process gas into a non-calibrated volume; and measuring changes in at least one property and/or attribute of the gas in the non-calibrated volume from which a flow rate and/or pressure of the gas entering the sensing circuit may be resolved.

20. The method of claim 17, wherein sensing further comprises:

sampling a characteristic of a gas present in the sensing circuit until at least one of an endpoint is reached, a confidence limit is reached or data converges within a predetermined range.

* * * * *

UNITED STATES PATENT AND TRADEMARK OFFICE
CERTIFICATE OF CORRECTION

| | | |
|---|---|---|
| PATENT NO. | : 7,743,670 B2 | Page 1 of 1 |
| APPLICATION NO. | : 11/833623 | |
| DATED | : June 29, 2010 | |
| INVENTOR(S) | : Lee et al. | |

It is certified that error appears in the above-identified patent and that said Letters Patent is hereby corrected as shown below:

On the title page, item [75]

In the Inventors (75):

Please delete "Jared Ahmed Lee" and insert --Jared Ahmad Lee-- therefor.

Signed and Sealed this

Fourth Day of January, 2011

David J. Kappos
*Director of the United States Patent and Trademark Office*